United States Patent [19]
Bell et al.

[11] 4,434,414
[45] Feb. 28, 1984

[54] SNAP-ACTING THERMAL RELAY

[75] Inventors: Lon E. Bell; William P. Gruber, both of Altadena, Calif.

[73] Assignee: Technar, Inc., Arcadia, Calif.

[21] Appl. No.: 249,383

[22] Filed: Mar. 31, 1981

Related U.S. Application Data

[63] Continuation-in-part of Ser. No. 174,916, Aug. 4, 1980.

[51] Int. Cl.³ .............................................. H01H 61/04
[52] U.S. Cl. ..................................... 337/102; 337/107; 337/141
[58] Field of Search ............... 337/102, 107, 100, 135, 337/136, 137, 141, 52, 53, 377

[56] References Cited

U.S. PATENT DOCUMENTS

| 2,080,244 | 5/1937 | Weirich | 337/107 X |
| 3,242,292 | 3/1966 | Malone | 337/107 |
| 3,611,236 | 10/1971 | Randolph | 337/102 X |
| 4,088,976 | 5/1978 | Bell | 337/107 |

FOREIGN PATENT DOCUMENTS 1041368  9/1966  United Kingdom ................ 337/135

Primary Examiner—George Harris
Attorney, Agent, or Firm—Christie, Parker & Hale

[57] ABSTRACT

A thermally operated snap-acting switch uses a switch arm and tension spring for rotating the switch arm. A thermal-responsive element moves the pivot of theswitch arm relative to the centerline of the spring to actuate the switch. Heater means activates the thermal-responsive element for operating the switch.

10 Claims, 8 Drawing Figures

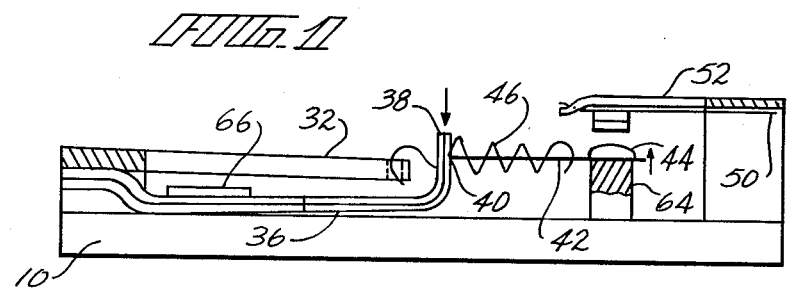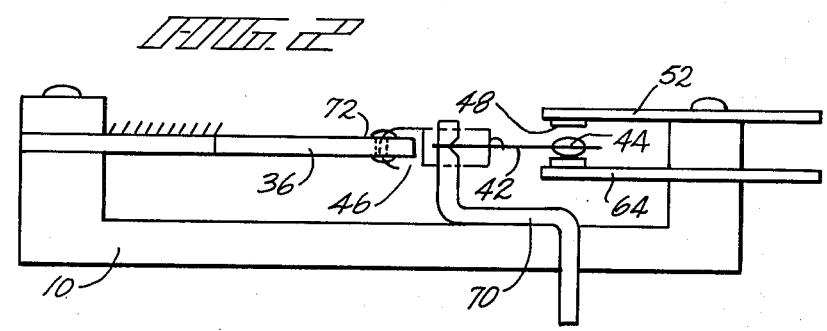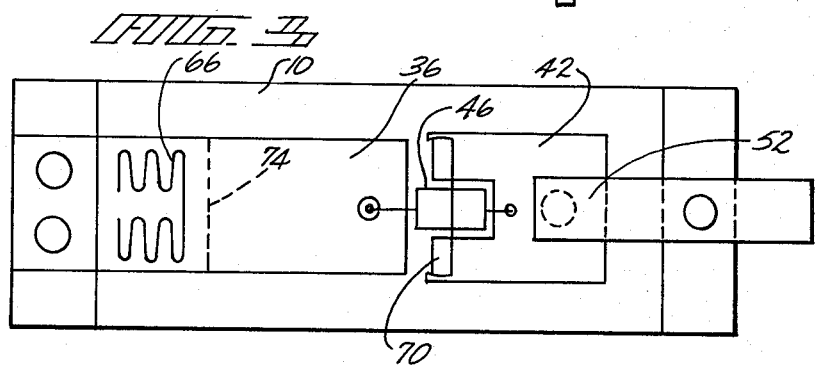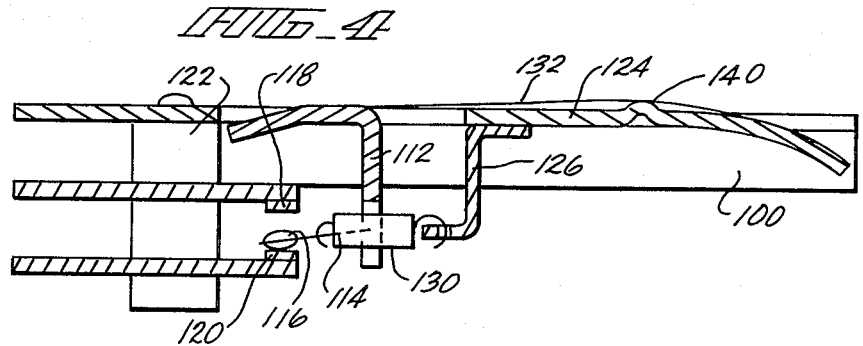

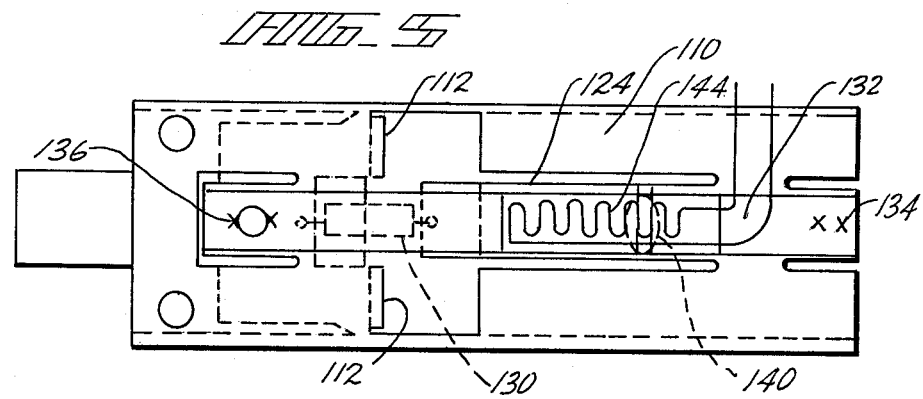
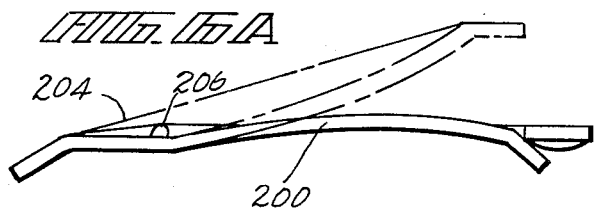
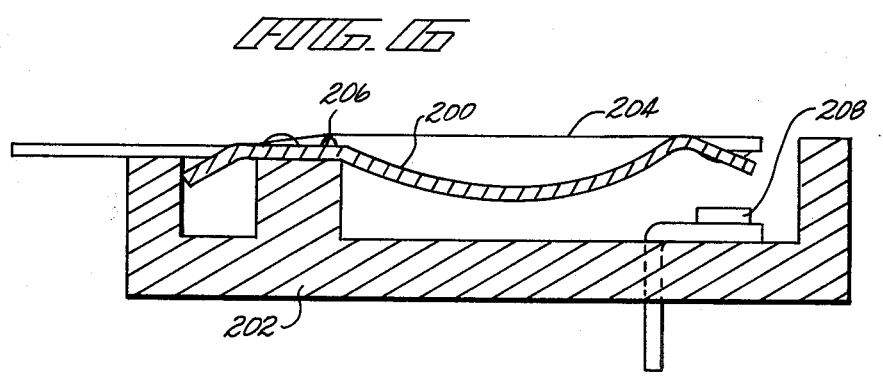
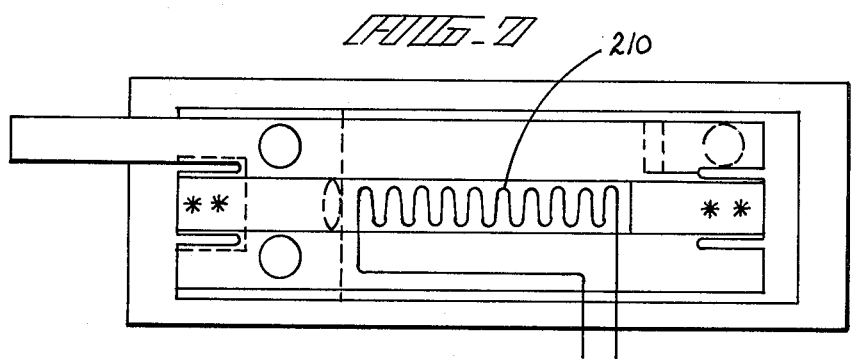

SNAP-ACTING THERMAL RELAY

CROSS-REFERENCE TO RELATED APPLICATIONS

This application is a continuation-in-part of application Ser. No. 174,916 filed Aug. 4, 1980, entitled "Fuel Heater for Diesel Engines".

FIELD OF THE INVENTION

This invention relates to a thermally actuated relay, and more particularly, to a thermal relay having a snap-action switch.

BACKGROUND OF THE INVENTION

Various types of thermally actuated relays have heretofore been proposed, such as described in U.S. Pat. No. 3,842,382 and U.S. Pat. No. 4,184,136. Such relays utilize direct heating of a bimetal element to actuate a switch. The thermal element utilizes a strap which expands and contracts as it is heated and cooled by a heater to bend a spring member which is designed to provide an over center snap-action.

SUMMARY OF THE INVENTION

The present invention is directed to an improved thermally actuated snap-action switch which is simpler to build, easier to calibrate, and provides improved sensitivity and reliability.

These and other advantages of the present invention are achieved by providing a snap-acting thermal switching device comprising a fulcrum member, a switch arm pivotally supported on the fulcrum member, spaced stop means forming a gap receiving the switch arm and providing fixed switch contacts for limiting rotation of the switch arm relative to the fulcrum, a tension spring having one end connected to the switch arm on one side of the fulcrum, means anchoring the other end of the spring on the opposite side of the fulcrum, a cantilever supported thermal element that bends with changes in temperature, heater means for heating the thermal element, and means connected with the moving end of the thermal element for moving the fulcrum relative to the tension spring to either side of the centerline of the spring with heating and cooling of the thermal element by the heater means.

BRIEF DESCRIPTION OF THE DRAWINGS

For a better understanding of the invention, reference should be made to the accompanying drawings, wherein:

FIG. 1 is a simplified view of one embodiment of the present invention;

FIG. 2 is a side elevational view of an alternative embodiment of the present invention;

FIG. 3 is a top view of the same embodiment as shown in FIG. 2;

FIG. 4 is a side elevational view of yet another embodiment of the present invention;

FIG. 5 is a top view of the embodiment of FIG. 4;

FIG. 6 is a side elevational view of a further embodiment of the preent invention;

FIG. 6A shows the change in position of the thermal switching element; and

FIG. 7 is a top view of the embodiment shown in FIG. 6.

DETAILED DESCRIPTION

Referring to FIG. 1 in detail, the numeral 10 indicates generally a base on which is mounted a frame member 32. The frame member 32 is supported from the base 10 in any suitable manner and provides a support for a bimetal thermal element 36 which is anchored at one end to the underside of the frame member 32. The free end of the bimetal element extends beyond the end of the frame member 32 and is bifurcated to form two upward turned fingers 38. These fingers are notched to provide a pivot point or fulcrum for a U-shaped contact arm 42 which supports a moving contact 44 of an electrical switch. A tension spring 46 is connected at one end to the outer end of the frame member 32 and at the other end to the outer end of the switch arm 42.

The spring 46 provides an over center action as the bimetal element 36 moves the fulcrum point of the switch arm 42 toward or away from the base 10 as the bimetal element changes temperature. When the temperature of the bimetal element goes down, the element moves closer to the base 10 so that the fulcrum point of the switch moves below the centerline of the spring 46, causing the arm 42 to rotate upwardly against a fixed electrical contact 48, thus closing the switch. The fixed electrical contact 48 is preferably mounted on a leaf spring 50 secured to a metal contact member 52 which is supported on the base 10. The contact member 52 forms a stop for limiting upward rotation of the switch arm. Downward rotation is limited by a stop 64.

A resistance heating element 66 attached to the bimetal element 36 may be used to apply heat to the bimetal. Heating the bimetal with the heater causes the switch to close. Turning off the heater causes the switch to again open. Thus the device of FIG. 5 operates effectively as a relay which is turned on and off by turning power on and off to the heater 66. The bimetal may be reversed at a point beyond the heater to provide ambient temperature compensation. By reversing the bimetal, any change in temperature of the bimetal which is uniform over its full length results in substantially zero net movement at the fulcrum. Since the heater 66 only heats one portion of the bimetal element, it causes movement of the fulcrum.

The temperature sensitivity can be increased, for example, by making the frame member 32 out of bimetal, also. For example, a single strip of bimetal can be folded over in a U-shape to form the two cantilever arms which engage the spring 46 and the switch arm 42.

Referring to the arrangement shown in FIGS. 2 and 3, the reverse bimetal element 36 is supported from the base 10 in cantilever fashion. The fulcrum support for the switch arm 42 is in the form of a rigid support bracket 70 mounted on the base 10. The tension spring 46 extends between the arm 42 and the end of the bimetal element 36. A ceramic grommet or the like 72 may be provided to electrically insulate the spring 46 from the bimetal element 36. The heater element 66 is in the form of a printed circuit resistive element of serpentine shape having a very thin nonconductive substrate which is applied directly to the surface of the bimetal element 36. The bimetal element is reversed along the line 74 so that changes in ambient temperature of the entire bimetal element 36 produces no net movement of the spring 46. However, heat applied to one end of the bimetal element by the heater 66 causes the outer end of the bimetal element to move upwardly, as viewed in FIG. 2, causing the switch arm 42 to rotate upwardly against the fixed contact 48.

Yet another embodiment of the snap-action thermal relay switch is shown in FIGS. 4 and 5. The relay includes a channel-shaped frame member 100 having a top plate 110. The top plate is formed with a pair of fingers 112 which are bent downwardly and form a fulcrum for a pivoted switch arm 114. The switch arm has a contact 116 which moves between a pair of fixed contacts 118 and 120 supported in spaced relationship from a standoff insulator 122 attached to the frame member 100. A cantilever arm 124 and an actuator arm extension 126 secured to the outer end of the arm 124 form a connection to one end of a tension spring 130. The other end of the tension spring is secured to the switch arm 114. A tension band or strap 132 is spot-welded or otherwise secured at opposite ends to the top plate 110, as indicated at 134 and 136. The ends are preferably attached to tabs formed in the top plate 110 so that by bending the tabs, the tension in the band 132 can be adjusted for calibration purposes. The band extends over a bridge or projecting ridge 140 in the arm 124 which lifts the band out of contact with the arm 124. A printed circuit type heating element 144 is applied to the surface of the band 132 for electrically heating the band.

In operation, it will be seen that as the heater heats the band, the band expands, relieving the tension and thereby relieving the force applied at the bridge 140 and allowing the end of the actuator arm 126 to move upwardly. This raises the centerline of the spring 130 above the pivot point of the arm 114, causing the arm 114 to rotate upwardly against the fixed contact 118. As the band cools down, the tension increases to the point where the actuator arm 126 is forced downwardly, causing the switch 114 to rotate downwardly against the fixed contact 120. The thermal coefficient of the band and the frame is selected so that an equal temperature change in both the frame and the band produces no net motion of the actuator arm 126. However, heating of the band to a temperature higher than that of the frame 100 causes the actuator arm to move in the manner described above.

In the arrangement shown in FIGS. 6 and 7, a spring blade 200 is secured adjacent one end to a base 202. The blade 200 is normally formed into a slightly arcuate shape in which the top surface is convex, as shown in FIG. 6A. The blade 200 is forced into a convex shape by a tension band 204 secured at its ends to opposite ends of the blade 200. The band 204 passes over a bridge or projecting ridge 206. The band causes the outer end of the blade 200 to be pulled away from a fixed contact 208 supported by the base 202. A heater 210 applied to the band 204, when energized, heats the band, causing it to expand. As the band expands, a point is reached where the blade snaps over center into its naturally convex shape, as shown in FIG. 6A, causing the end of the blade to move down into contact with the fixed contact 208. As the band is allowed to cool, the tension increases to a point where the band forces the blade to snap back into the concave shape shown in FIG. 6, thereby opening the switch again.

From the above description, it will be seen that a snap-action type thermal relay is provided which produces a relatively fast-acting, highly sensitive relay switch which is fully ambient compensated. At the same time, the relay switch is very inexpensive to manufacture as compared to more conventional type magnetic relays.

What is claimed is:

1. A snap-acting switching device comprising a fulcrum member, a switch arm pivotally supported on the fulcrum member, spaced stop means including at least one switch contact forming a gap receiving the switch arm for limiting rotation of the switch arm relative to the fulcrum, a tension spring having one end connected to the switch arm on one side of the fulcrum, means anchoring the other end of the spring on the opposite side of the fulcrum, a cantilever supported thermal-responsive element that moves with changes in temperature, and means connected with the moving end of the thermal-responsive element for moving the fulcrum relative to the tension spring to either side of the centerline of the spring with heating and cooling of the thermal-responsive element.

2. Apparatus of claim 1 wherein the thermal-responsive element is connected to the anchoring means for moving the end of the tension spring.

3. Apparatus of claim 1 wherein the thermal-responsive element is connected to the fulcrum member for moving the fulcrum member.

4. Apparatus of claim 2 or 3 wherein the thermal-responsive element is made of bimetal.

5. Apparatus of claim 4 wherein the anchoring means and the fulcrum member are both supported by the bimetal thermal-responsive element.

6. Apparatus of claim 4 wherein the bimetal is reversed over a portion of the length of the element so that the two portions bend in opposite directions with change in temperature.

7. Apparatus of claim 6 further including electric heater means for selective heating only one of said reversed bimetal portions to produce net bending of the bimetal in one direction.

8. Apparatus of claim 2 wherein the thermal-responsive element includes a metal plate having a slot and a metal arm having one end fixed in relation to the plate, the arm having a bridge extending through the slot, a metal band secured at either end to the plate and across the bridge, the band being under tension and pressing down on the bridge and arm under ambient temperature conditions to bend the arm, heater means for heating the band to relieve the tension and move the arm, and means connected to the arm for moving the fulcrum relative to the end of the spring to actuate the switch arm.

9. Apparatus of claim 8 further including electrical heater means for heating the band.

10. Apparatus of claim 1 further including electrical heater means for heating the thermal-responsive element.

* * * * *